United States Patent [19]
Kalifon

[11] 3,857,091
[45] Dec. 24, 1974

[54] APPARATUS HAVING ULTRASONIC TRANSDUCER FOR DETECTING CABLE DIELECTRIC FAULTS

[75] Inventor: Sam Kalifon, Old Bridge, N.J.

[73] Assignee: Continental Copper & Steel Industries, Inc., New York, N.Y.

[22] Filed: July 24, 1972

[21] Appl. No.: 274,485

[52] U.S. Cl. .................................. 324/52, 324/54
[51] Int. Cl. ... G01r 31/02, G01r 31/08, G01r 31/12
[58] Field of Search ..................... 324/52, 54, 51

[56] References Cited
UNITED STATES PATENTS

| | | | |
|---|---|---|---|
| 2,882,490 | 4/1959 | Sheets | 324/54 |
| 3,370,226 | 2/1968 | Widmer | 324/52 X |
| 3,462,682 | 8/1969 | Barnett et al. | 324/54 |
| 3,551,804 | 12/1970 | Weddle | 324/52 |

Primary Examiner—Gerard R. Strecker
Attorney, Agent, or Firm—Arthur A. March, Esq.

[57] ABSTRACT

Apparatus for precisely and non-destructively locating dielectrical faults in a length of multiconductor cable. The cable is transferred continuously from a supply to a take-up reel through an anechoic chamber while its terminal end is electrified by a high potential source through a ring and brush assembly. A probe, connected to an ultrasonic transducer, is held close to the surface of the cable as it is being rewound. When the defect being sought passes under the probe, the spark associated with that defect is rendered instantly audible by an alarm actuated by the transducer.

7 Claims, 2 Drawing Figures

{ 3,857,091 }

APPARATUS HAVING ULTRASONIC TRANSDUCER FOR DETECTING CABLE DIELECTRIC FAULTS

BACKGROUND OF THE INVENTION

This invention relates to the testing of shielded multiconductor cables, and more particularly, to the detection of short circuits in the cable.

Shielded multiconductor cables generally are manufactured as a plurality of independent conductors or wires housed within an outer sleeve or shield which is always grounded. Such multiconductors may form communication cables with the plurality of conductors concentrically arranged in groups and all housed within the shielded cable. In the manufacturing process at times, unfortunately, faults inevitably occasionally occur which sometimes take the form of short circuits between contiguous conductors or there is a defect in the insulation or a break in the conductor. Such imperfections cannot be tolerated since they render the cable functionally inoperable. One consequence of such short circuits is an arcing, characterized as a spark, between such conductors. This type of a fault is commonly referred to as a dielectrical failure.

Even if it is known that such a fault exists, its location along the length of the multi-strand cable is often difficult or impossible to detect. Due to the cost of such cables, it is preferable to locate and repair the fault or to simply cut it out in lieu of destroying the complete cable.

Prior methods and apparatus fail to detect such dielectric faults in a convenient and simple manner and, further, fail to accurately locate the place of arcing between conductors or between a conductor and the grounded shield. Further, these methods and apparatus are often not suitable for use with long lengths of cable.

SUMMARY OF THE INVENTION

An object of this invention is to provide a method and apparatus for detecting and locating dielectric faults in multiconductor cables.

Another object of this invention is to provide such a method and apparatus which is relatively simple and can be operated by a relatively unskilled technician.

Still another object of this invention is to provide such a method and apparatus which accurately locates the dielectric fault within a long length of cable.

Yet another object of this invention is to provide such a method and apparatus which does not impair the performance of the cable after the location of the dielectric fault is found.

Another object of this invention is to provide such a method and apparatus which may conveniently be used at the manufacturing plant.

Still another object of this invention is to provide a reliable method and apparatus for the detection of such dielectric faults in the multiconductor cable.

Still another object is to provide a method for locating a fault in a cable without the necessity of knowing the length thereof.

Other objects, advantages and features of this invention will become more apparent from the following description.

In accordance with the principles of the present invention, the above objects are accomplished by providing an apparatus for detecting and locating dielectric faults in a multiconductor cable which comprises a supply reel and take-up reel, the cable being wound off the supply to the take-up reel, an anechoic chamber disposed between the supply and take-up reels and being provided with inlet and outlet orifices for allowing the cable to pass therethrough, a high voltage source connectable to the ends of the conductors at the take-up reel, a probe located within the anechoic chamber, the voltage source causing spark-generated high frequency sound waves to occur at the point of the dielectric fault, the sound waves being detected by the probe, and transducer connected to the probe for producing an audible signal where the spark passes beneath the probe and triggering an integral alarm which stops the travel of the cable through the chamber at the point of failure, thus fully automating the detection of the fault.

The cable is continuously fed through the chamber and is continuously monitored by an electric alarm incorporated in the transducer. At the point where the arcing occurs, a crackling sound will be produced, thus, precisely and audibly identifying the location of the dielectric fault.

Preferably, the source of high voltage is maintained across a conventional ring and brush assembly on the take-up reel. The probe is provided with an ultrasonic transducer which is held or supported close to the surface of the cable by a suitable and easily adjustable clamp as it passed through the chamber. The ends of the chamber, moreover, are equipped with rollers that keep the position of the cable in both the vertical and horizontal planes constant. Without such positional control the cable, by occasionally striking the probe, would induce a spurious fault signal.

The anechoic chamber serves to enhance the sensitivity of the apparatus, thus providing an extremely accurate and reliable result.

IN THE DRAWINGS

In the accompanying drawings.

DETAILED DESCRIPTION OF THE INVENTION

Figures 1, 2:
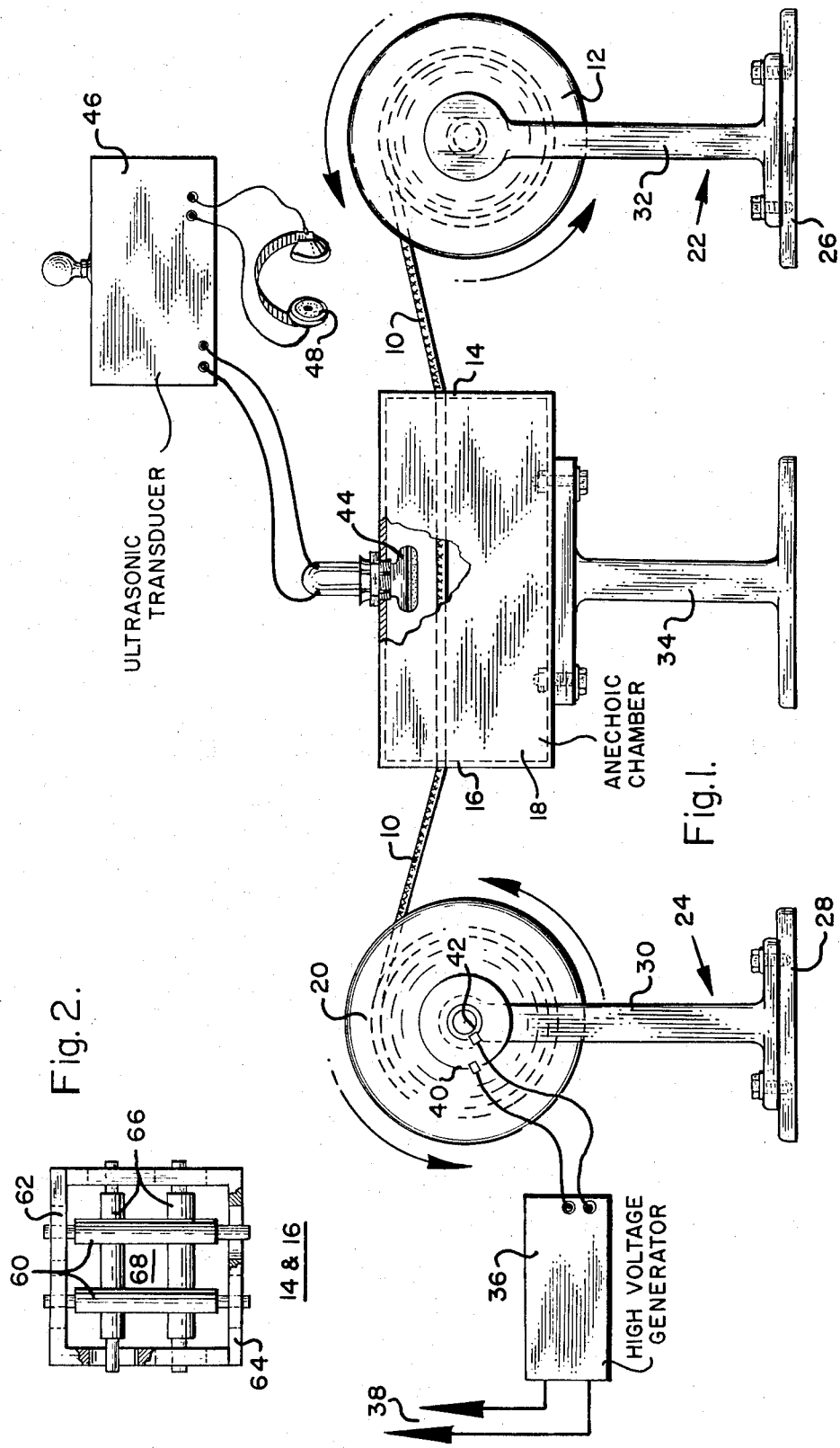
FIG. 1 is a view illustrating the present method and apparatus for detecting dielectric faults within a defective multiconductor cable.
FIG. 2 is a view of the inlet and outlet orifice roller devices which are disposed on each side of the anechoic chamber.

Referring to FIG. 1, there is shown a multiconductor cable 10 such as a communications cable having a surrounding shield which is paid off from a supply reel 12, passing through roller-guide equipped inlet and outlet orifices 14 and 16, respectively, of an anechoic chamber 18, to a take-up reel 20. Take-up reel 20 is driven by driving means, not shown. The supply and take-up reels are mounted on respective stands 22 and 24 which comprise base portions 26 and 28 respectively and vertical support members 30 and 32 which are bolted to base members 26 and 28, respectively. Similarly, the anechoic chamber 18, which illustratively is Eckel Industries Test Enclosure, Model No. 366, is mounted on a support base member 34 through suitable bolt means. The anechoic chamber is characterized by almost complete damping of all sounds emanating from without the chamber.

A high voltage generator 36 is connected to a conventional power source 38 and supplies a conventional ring and brush assembly 42 with potential in the range of 500–1,500 V.D.C. located at the take-up reel end of the multiconductor cable. In this way the voltage or power source 38 is connected to the conventional ring and brush assembly 42 with one terminal connected to ground through the vertical support and the other terminal connected to one of the conductors of the multiconductor cable 10.

In FIG. 2 there is shown an end view of the roller guide assembly which is inserted in both orifices 14 and 16. A pair of parallel apposed rollers 60, journalled in a frame end 62 and 64 coact with another pair of parallel apposed rollers 66 to form an opening 68 which holds the cable 10 firmly and evenly as it passes through anechoic chamber 18.

As the cable 10 moves through the chamber 18, it passes a probe 44 which is mounted within the sound chamber by an easily adjustable clamp means and is sensitive to high frequency sound waves. The probe 44 is electrically connected to an ultrasonic transducer 46 which renders the high frequency sound waves audible either in a pair or earphones, 48, or over a loud speaker.

The apparatus illustrated in the figure operates as follows:

The cable 10 is continuously fed from the supply reel to the take-up reel passing through the anechoic sound chamber. The surface of the cable, regardless of its diameter, is held at a fixed distance from the probe. The high voltage generator through the ring and brush assembly applies potential to one end of the reel of cable in which a dielectric fault is known to have occurred. The probe detects the high frequency sound waves produced by the spark at the dielectric fault as it passes through the chamber. These sound waves are then converted to an electrical signal which actuates the alarm mechanism and halts the take-up drive. In this manner, the exact location of the dielectric fault in the multiconductor cable is determined. In the operation it will be appreciated that the connection is made from the generator 36, which is connected to a conventional power source to supply to the ring and brush assembly 42, voltage in the range of 1,000 volts direct current.

In the manufacture of cables, it is customary to form the multi-conductor cable inside the housing sheath and then, to test each conductor included within the cable sheath prior to its actual use. Upon occasion one or more conductors fail to properly test.

It is for the purpose of detecting any flaw in the conductor that fails to test that this application finds its main use for commercial manufacture. It would be a great financial loss and sacrifice to have to destroy a complete multi-conductor cable if only a single conductor (or even more than one) of a large group failed to function for some reason or other, such as, where there is a break in the conductor or a break in the insulation or some condition causing some short circuit condition resulting in arcing, which is a type of fault commonly known as "dielectric failure."

By use of this invention where the cable shield is grounded through an element such as the base member 34, the take-up reel 30 also forms a grounded support base member and testing is readily achieved. In this way, by running the cable 10 from the supply reel 12, to the take-up 20, through the anechoic chamber 18 and connecting the shield or a conductor of the cable to one input terminal from the source and another conductor of the cable to the other input terminal from the source, it can be seen as soon as the cable 10 passes beneath the probe 34 that there will be a sparking condition for fault conditions and this sparking effectively closes the circuit which otherwise would not be formed. It is this sparking effect which induces in the pick-up an indication in the precise region where a fault occurs in the multi-conductor so that this section of the cable can be replaced without a total loss of the complete cable length. It should be appreciated that it is a simple matter to splice a wire, or a cable section, but where there is a faulty condition in the cable due to only a single conductor condition present, it would be a significant loss if the entire cable could not be used for this reason.

It is also contemplated that means to automatically disengage the driving means for take-up reel 20 may be provided so that when a fault is detected by probe 44 and a signal is relayed to the transducer 46, a pair of normally closed contacts on the transducer open and disengage and brake the driving means for the take-up reel.

The term conductor as used in the appended claims shall include the shield as well as the conductors within the multiconductor cable.

It will thus be seen that the objects set forth above, among those made apparent from the preceding description, are efficiently attained and, since certain changes may be made in the above method and apparatus without departing from the scope of the invention, it is intended that all matter contained in the above description and shown in the accompanying drawings shall be interpreted as illustrative and not in a limiting sense.

I claim:

1. An apparatus for detecting and locating a dielectric fault within a multiconductor cable comprising
   a supply reel;
   a take-up reel;
   an anechoic chamber having inlet and outlet orifices;

said cable being supplied from said supply reel through said inlet orifice of said anechoic chamber to said take-up reel from the outlet orifice;
   a source of high potential connected between the faulty conductor and another conductor at one end of said multiconductor cable and adapted to cause sparking effects adapted to produce high frequency sound waves at uninsulated conductor segments of the cable in the region between the two reels and within the anechoic chamber;
   a probe sensitive to high frequency sound waves mounted within said anechoic chamber;
   clamp means and guide means to position and guide said cable to maintain a predetermined spacing and separation of the cable within the said chamber relative to the said probe, and
   audio means coupled to said probe means for producing an audible signal when said dielectric fault is detected at the uninsulated cable portion within the chamber.

2. An apparatus for detecting and locating a dielectric fault within a multiconductor cable as set forth in claim 1, comprising a ring and brush assembly connecting said source of high potential to said end of said multiconductor cable.

3. An apparatus for detecting and locating a dielectric fault within a multiconductor cable as set forth in claim 1, wherein the probe within the chamber is located near the surface of the cable and is sensitive to the sparking effects produced when voltage is applied to the cable.

4. An apparatus for detecting and locating a dielectric fault within a multiconductor cable as set forth in claim 3, comprising an ultrasonic transducer connected between said probe and said audio means.

5. An apparatus for detecting and locating a dielectric fault within a multiconductor cable as set forth in claim 4, wherein said audio means is a headphone.

6. An apparatus for detecting and locating a dielectric fault within a multiconductor cable as set forth in claim 4, wherein said audio means is a loudspeaker.

7. An apparatus for detecting and locating a dielectric fault within a multiconductor cable as set forth in claim 1, wherein said source of potential supplies a voltage in the range of 500–1,500 D.C. volts.

* * * * *